United States Patent [19]

Motzko

[11] Patent Number: 5,201,023

[45] Date of Patent: Apr. 6, 1993

[54] VARIABLE SPEED LATCHING MOTOR CONTROL

[75] Inventor: Andrew R. Motzko, Burnsville, Minn.

[73] Assignee: Wagner Spray Tech Corporation, Minneapolis, Minn.

[21] Appl. No.: 735,710

[22] Filed: Jul. 30, 1991

[51] Int. Cl.⁵ .............................................. G05B 5/00
[52] U.S. Cl. ................................... 388/824; 388/815; 388/822; 388/910
[58] Field of Search ......................... 388/809–815, 388/910, 816–824

[56] References Cited

U.S. PATENT DOCUMENTS

| | | | |
|---|---|---|---|
| 4,599,545 | 7/1986 | Moriki et al. | 318/599 X |
| 4,628,235 | 12/1986 | Goings | 318/430 |
| 4,673,851 | 6/1987 | Disser | 319/629 X |
| 4,809,122 | 2/1989 | Fitzner | 318/434 X |
| 4,841,165 | 6/1989 | Bowles | 318/599 X |
| 4,873,453 | 10/1989 | Schmerda et al. | 318/599 X |
| 4,955,431 | 8/1990 | Saur et al. | 388/822 X |
| 4,967,309 | 10/1990 | Hoffman | 318/432 X |

Primary Examiner—William M. Shoop, Jr.
Assistant Examiner—David Martin
Attorney, Agent, or Firm—Faegre & Benson

[57] ABSTRACT

A solid state electronic motor power control circuit for portable paint pumps having a MOSFET power control device and an operational amplifier connected to the MOSFET to selectively operate as a switch driver in a first state and as a linear gain amplifier in a second state. The operational amplifier has a feedback path from the motor to compensate for motor load variations.

9 Claims, 2 Drawing Sheets

VARIABLE SPEED LATCHING MOTOR CONTROL

BACKGROUND OF THE INVENTION

In the past, it has been known to provide paint to a paint roller via a paint supply tube and to do so upon demand, i.e., as paint was called for by actuation of a switch on the roller handle. Such prior systems typically operated the pump at a fixed, non-adjustable speed, thus requiring the operator to modulate paint flow by selective actuation of the switch in the paint roller handle. Other systems did not provide a switch in the paint roller handle and required an operator to modulate paint delivery by selective actuation of a switch located remote from the roller at the paint delivery pump.

The present invention overcomes deficiencies of the prior art by providing a paint delivery system for a portable paint applicator where the motor and hence pump speed is infinitely variable and selectable by the operator to provide a desired flow rate. Furthermore, the present invention compensates to maintain motor speed constant in the face of changing loads.

DETAILED DESCRIPTION

Figure 1:
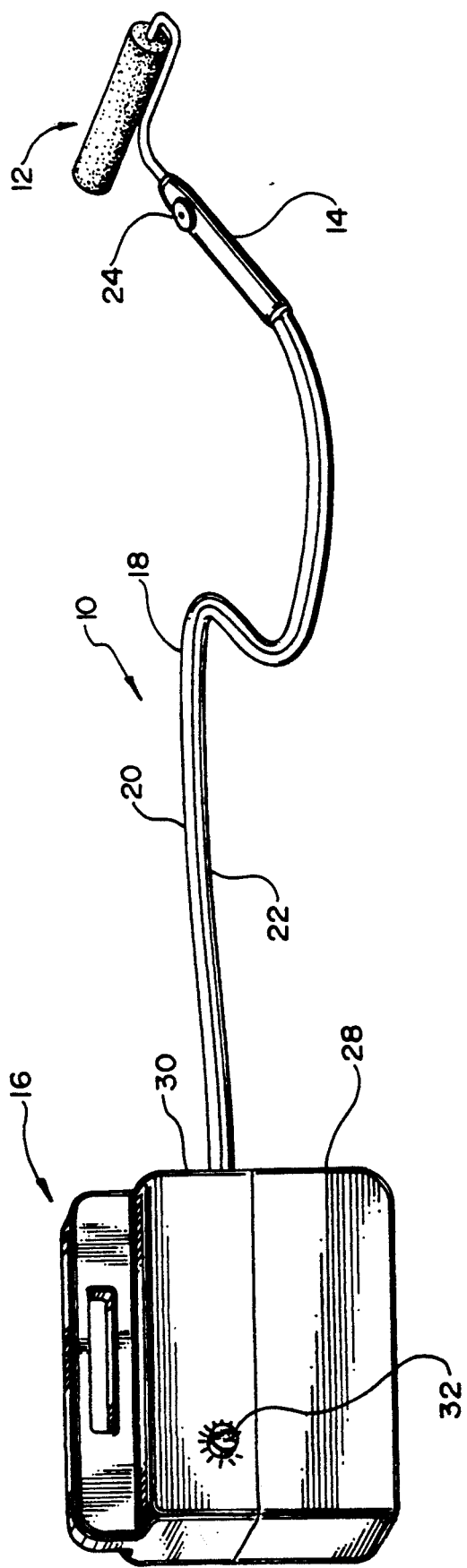
FIG. 1 shows a pictorial view of a portable painting system utilizing the present invention.
Figure 2:
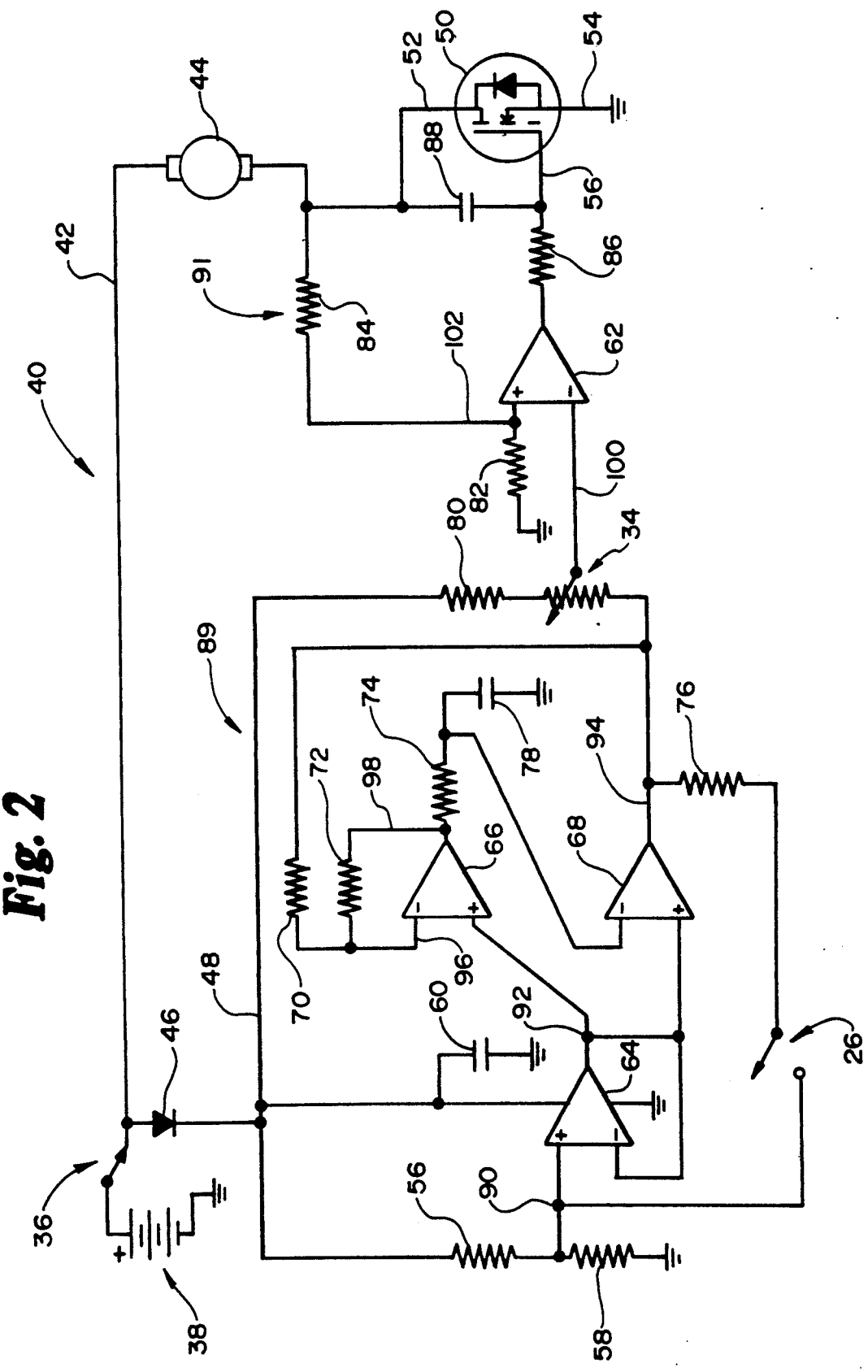
FIG. 2 shows a detailed electrical schematic of the variable speed latching motor control circuit of the present invention.

Referring now to FIGS. 1 and 2, a portable painting system 10 may be seen. System 10 preferably includes a paint applicator such as a roller 12 having a handle 14 connected to a base unit 16 via a double lumen hose 18. It is to be understood that paint is supplied through one lumen 20 of hose 18, while a second lumen 22 connects a flexible rubber actuator 24 in handle 14 via an air passageway to a switch 26 (see FIG. 2) in base unit 16. Base unit 16 preferably has a paint reservoir 28 and a battery operated motor driven paint pump (not shown) in a cover 30 of base unit 16. Base unit 16 also preferably has a knob 32 connected to rotate a potentiometer 34 and may include a switch 36 at the end of travel of potentiometer 34. To operate painting system 10, knob 32 is rotated to close switch 36 and to position potentiometer 34 to a desired level to supply paint through lumen 20 of hose 18 to roller 12. It is to be understood that actuator 24 must be temporarily depressed to momentarily close switch 26 to cause paint to flow. Paint will continue to flow until actuator 24 is again depressed, closing switch 26 momentarily; thereafter paint flow will remain stopped until actuator 24 is again depressed.

Referring now more particularly to FIG. 2, details of the circuit schematic of a solid state motor power control 40 may be seen. Control 40 is preferably powered by a 6 volt battery 38 which may made up of four 1.5 volt cells in series. Battery 38 is connected to ON/OFF switch 36 directly via line 42 to motor 44 and through a diode 36 to a +V power bus 48. A MOSFET transistor or power control device 50 controls power to motor 44 MOSFET 50 is preferably a Hitachi type K-971 transistor. Transistor 50 preferably has first and second power terminals 52, 54 connected in series with pump motor 44 and battery 38. Transistor 50 further has a third terminal 56, which in this embodiment is the insulated gate, and is operable to control conductivity between the first and second terminals of the MOSFET transistor or power control device 50. Circuit 40 also preferably has a 110K resistor 56, a 68K resistor 58, 0.1 uf capacitor 60, and a type LM324 quad operational amplifier integrated circuit having four operational amplifiers 62, 64, 66 and 68. Circuit 40 also has three 110K resistors 70, 72, 74 and a 10K resistor 76, a 0.1 uf capacitor 78, a 1M resistor 80, a pair of 68K resistors 82, 84 and a 56K resistor 86. A 0.1 uf capacitor 88 is preferably connected between gate 56 and drain 52. Potentiometer 34 is preferably 500K.

The operation of the circuit is as follows. Diode 46 protects the operational amplifiers against accidental reverse polarity due to improper battery installation. The control circuit 40 is energized by battery 38 when switch 36 is closed. Resistors 56 and 58 form a high resistance voltage divider which provides a control voltage at terminal 90. Op amp 64 is used as a voltage follower which reproduces the node 90 voltage at node 92. Follower 64 provides a low resistance driver for the non-inverting inputs of operational amplifiers 66 and 68. Op amp 68 is used as a comparator and its output at node 94 will be high when the control voltage at node 92 is higher than the voltage across the terminals of capacitor 78. Under power up conditions, the voltage at node 92 is approximately 2 volts (with a battery voltage of 6 volts) and the voltage across capacitor 78 is approximately 0 volts. Therefore the output of comparator 68 is high and is fed back to the negative or inverting input 96 of amplifier 66 through resistor 70. Amplifier 66 provides amplification with negative feedback through resistors 70 and 72. This will reflect the control voltage at node 92 to the inverting input 96 of amplifier 66. Since resistors 70 and 72 are of equal value, the voltage across capacitor 78 will be driven as much below node 92 as the output 94 of comparator 68 is above node 92. This maintains a stable output state of op amp 66 at a low condition and a high stable output condition for comparator 68. With comparator 68 high, the voltage at terminal 52 will be high and in fact substantially equal to the voltage on line 42, maintaining the motor in an OFF condition. This condition exists at power up until switch 26 is activated by actuator 24 acting on an air-actuated diaphragm associated with switch 26 when air is pressurized in the second lumen 22 of hose 18. When switch 26 is actuated, the high condition at the output of comparator 68 is fed back to node 90 through resistor 76 and switch 26. This causes the control voltage to increase at the non-inverting input 90 of amplifier 64 and also at the non-inverting input 92 of comparator 68. This increase causes the output 98 of amplifier 66 to increase and therefore charges capacitor 78 to a point just below the new control voltage at node 92. The output of comparator 68 will not yet change state. When switch 26 is released (i.e., returned to an open circuit condition) the control voltage at node 92 will drop back to its original value, but since the voltage across capacitor 78 cannot change instantaneously, comparator 68 will now change state, with its output on line 94 going to a low output state. This change will force the output of amplifier 66 on line 98 to a high condition charging capacitor 78 to a point as much above node 92 as the output of comparator 68 us below node 92. This maintains a stable state for amplifier 66 and comparator 68 which together with their respective associated circuit components form a bistable multivibrator 89.

Turning now also to a linear gain stage 91 of control 40, when the output 94 of comparator 68 is low, operational amplifier 62 will shift from acting as a switch driver to a linear gain amplifier, turning motor 44 ON via power control device 50. This condition will remain until power is turned off via switch 36 or until switch 36 is actuated. If switch 36 remains closed and switch 26 is actuated, the bistable multivibrator or flip flop 89 will return to a stable condition in which the output 98 of amplifier 66 is low and the output 94 of comparator 68 remains high, causing amplifier 62 to shift into its switch drive mode, turning OFF device 50 and motor 44. Thus, the solid state control 40 can shift the power control device 50 between two states, a first state of high impedance blocking power to the motor 44, and a second state wherein the device 50 has a variable impedance regulating the power delivered to motor 44.

The operation of the linear gain amplifier stage 91 is as follows. When the second logic output condition is provided by comparator 68 on line 94, line 94 is driven to a low condition providing a range of adjustment for potentiometer 34 of from approximately 0 to approximately 1.8 volts. It is to be understood that the low end of this voltage range corresponds to a large voltage (i.e. approximately 6 volts) across motor 44 and a voltage at or near 1.8 volts on line 100 corresponds to a voltage across motor 44 of approximately 2.4 volts, assuming battery 38 is 6 volts. A voltage at the inverting input 100 of amplifier 62 will cause amplifier 62 to drive device 50 until the same voltage appears at the non-inverting input 102. Although resistor 84 is connected to the non-inverting input of amplifier 62, it is to be clearly understood that the control loop for the linear gain amplifier stage 91 has a negative or self-correcting characteristic type feedback because of the relative circuit locations of motor 44 and device 50. The linear gain amplifier stage 91 regulates device 50 in its second or variable impedance state to hold the speed of motor 44 constant at a level set by an operator using the potentiomenter adjustment means 34 via knob 32. Feedback through resistor 84 acts as compensation means to correct for any variations in the voltage at line 52 arising from changes in the current of motor 44 due to load changes.

The invention is not be taken as limited to all of the details thereof as modifications and variations thereof may be made without departing from the spirit or scope of the invention; for example a brush or pad may be substituted for the paint roller without departing from the invention.

What is claimed is:

1. A solid state motor power control for portable paint pumps comprising:
   a) a MOSFET power control device having first and second terminals connected in series with a pump motor and a battery power source, the MOSFET power control device having a third terminal operable to control conductivity between the first and second terminals of the MOSFET power control device;
   b) solid state control means connected to the third terminal of the MOSFET power control device and selectively operable in response to an operator actuated switch for placing the MOSFET power control device in one of two states, the two states being:
      i) a first state having a relatively high impedance, blocking power to the motor, and
      ii) a second state having a continuously variable impedance wherein motor speed is regulated by the MOSFET power control device.

2. The solid state motor power control of claim 1 wherein the solid state control means comprises means for regulating the MOSFET power control device in the second state such that the motor operates at substantially constant speed.

3. The solid state motor power control of claim 2 wherein the means for regulating the motor in the second state further comprises adjustment means for adjusting the speed at which the motor operates.

4. The solid state motor power control of claim 2 wherein the solid state control means further comprises compensation means for compensating the MOSFET power control device in the second state for motor load variations.

5. The solid state motor power control of claim 4 wherein the solid state control means comprises an integrated circuit having four operational amplifiers, the first operational amplifier forming a switch driver and linear gain amplifier and the second, third and fourth operational amplifiers connected to form a bistable multivibrator switching circuit means for providing a first logic output state to the first operational amplifier in the first state and a second logic output state to the first operational amplifier in the second state.

6. The solid state motor power control of claim 5 wherein the first logic output state corresponds to a motor OFF condition and the second logic output state corresponds to a motor ON condition.

7. The solid state motor power control of claim 6 wherein the second logic output is provided to an adjustment means for allowing the motor speed to be adjusted in the motor ON condition.

8. The solid state motor power control of claim 5 wherein the bistable multivibrator switching circuit means is connected to an air-pressure actuated momentary contact switch and further wherein the bistable multivibrator switching circuit means toggles from one logic output state to the other logic output state in response to each actuation of the air-pressure actuated switch.

9. The solid state motor power control of claim 2 wherein the means for regulating comprises at least one operational amplifier connected to the third terminal of the MOSFET power control device and wherein the one operational amplifier is selectively operable as: i) a switch driver in the first state, and ii) a linear gain amplifier in the second state.

* * * * *